United States Patent [19]

Koopman

[11] Patent Number: 4,728,532

[45] Date of Patent: Mar. 1, 1988

[54] METHOD OF EXTERNALLY COVERING METAL OBJECTS

[75] Inventor: Hendrik Koopman, Puttershoek, Netherlands

[73] Assignee: Troost Pernis Groep B.V., Netherlands

[21] Appl. No.: 898,500

[22] Filed: Aug. 21, 1986

Related U.S. Application Data

[63] Continuation of Ser. No. 589,055, Mar. 15, 1984, abandoned, which is a continuation of Ser. No. 408,780, Aug. 17, 1982, abandoned.

[30] Foreign Application Priority Data

Aug. 21, 1981 [NL] Netherlands .......................... 8103899

[51] Int. Cl.⁴ ............................................. B05D 3/02
[52] U.S. Cl. ..................................... 427/46; 156/187; 156/188; 156/195; 427/286; 427/374.1; 427/379; 427/388.1
[58] Field of Search ................ 427/46, 45.1, 286, 287, 427/374.1, 379, 388.1, 388.2, 401, 409, 410; 156/187, 188, 195

[56] References Cited

U.S. PATENT DOCUMENTS

| | | | |
|---|---|---|---|
| 2,161,036 | 6/1939 | Gremmel | 156/187 |
| 3,163,182 | 12/1964 | Sandow et al. | 156/188 |
| 4,213,486 | 7/1980 | Samour et al. | 156/187 |
| 4,230,742 | 10/1980 | Klein | 427/287 |
| 4,244,985 | 1/1981 | Graff et al. | 427/46 |
| 4,304,822 | 12/1981 | Heyl | 427/46 |
| 4,323,601 | 4/1982 | McMillan et al. | 427/287 |

FOREIGN PATENT DOCUMENTS

| | | | |
|---|---|---|---|
| 2257135 | 6/1974 | Fed. Rep. of Germany | 427/46 |
| 51-4285 | 1/1976 | Japan | 156/187 |

*Primary Examiner*—Sadie L. Childs
*Attorney, Agent, or Firm*—John P. Snyder

[57] ABSTRACT

A tubular metal object is rotated about its longitudinal axis and a layer of tape and synthetic thermosetting resin is wrapped around the object at room temperature. The object is inductively heated substantially uniformly through its thickness a plurality of times progressively from one end to the other subsequent to the wrapping to a temperature sufficient to allow the resin to flow on the outer surface of the object. The object is further inductively heated to a temperature at which the resin will cure, and the object is then cooled to room temperature.

6 Claims, 1 Drawing Figure

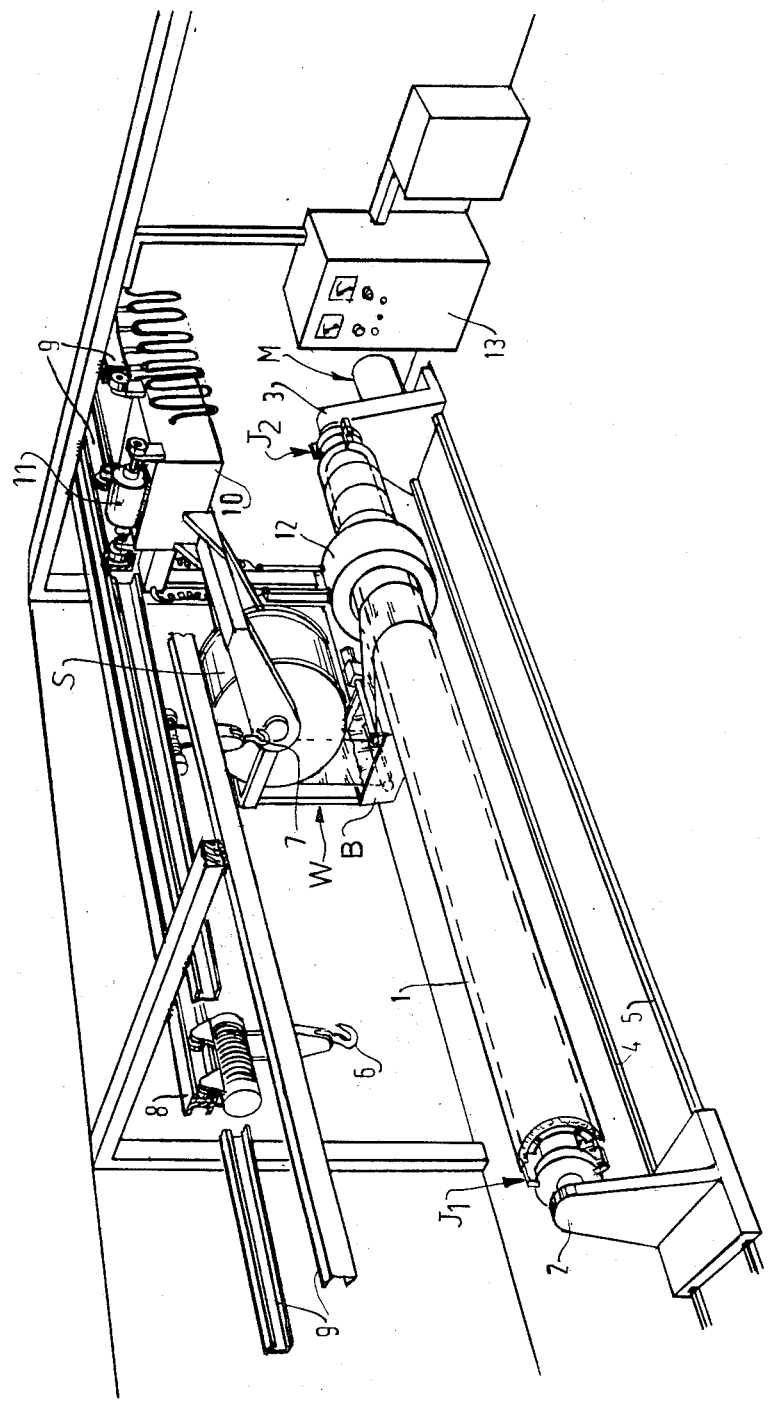

METHOD OF EXTERNALLY COVERING METAL OBJECTS

CROSS REFERENCE TO RELATED APPLICATION

This application is a continuation of my copending application Ser. No. 589,055, filed Mar. 15, 1984, now abandoned which was a continuation of Ser. No. 408,780, filed Aug. 17, 1982 and now abandoned.

BACKGROUND AND BRIEF SUMMARY OF THE INVENTION

Notably in chemical and oil industries the metal pipes to be buried in the ground have to be protected against corrosion. This is done by applying a synthetic resin layer thereto. The known method is disclosed in the German patent application Offenlegungsschrift No. 2 257 135 and utilizes, as does this application and the invention thereof, inductive heating of the metal pipe or object to induce flow of the thermosetting resin and curing thereof. In this known method, however, the inductive heating is carried out with a sufficiently high frequency of energization of the inductive coil as to effect a differential heating of the metal pipe, i.e., to produce the highest temperature in the skin thereof and lesser temperatures inwardly of the skin. Moreover, in the prior art in general, the pipe if of large dimensions is subjected to preheating to an intermediate temperature prior to wrapping the pipe, the preheated temperature typically being in the order of about 80° C. To this end radiation heat may be used instead of the inductive heating mentioned above. In any event, the objective of the preheating is so that as soon as the coating material with the resin comes into contact with the pipe the resin starts flowing, by which a satisfactory seal is intended to be obtained between the various turns of the wrapping material or tape.

The invention has for its object to improve the known method in a manner such that the seal is better ensured and energy can be saved.

According to the invention these two objectives are achieved in that during the winding operation the pipe is maintained approximately at room temperature and subsequent to the winding operation the pipe is gradually and subsequently uniformly heated throughout its thickness progressively from one end to the other end thereof up to a first temperature, at which the resin becomes fluid and is maintained at said first temperature while the pipe is rotated about its longitudinal axis for a time sufficient to allow the resin to spread and assure that the ultimate sealing and insulation is most effective. In addition, the frequency of the alternating current which energizes the induction coil during heating is chosen such that the whole object is gradually heated, i.e., it is not differentially heated as in the prior art but is substantially uniformly heated throughout its thickness. Since the pipe is not preheated, the resin hardly fluidizes upon winding. Subsequent to completion of the winding operation and the gradual and uniform heating of the pipe to the first temperature, the resin will slowly and quite gradually become fluid and hence a satisfactory spread and a satisfactory seal and insulation are ultimately obtained. Moreover, the required amount of thermal energy is lower. The first temperature range lies around about 90° C. This first temperature range can be stepwise attained. Some time after the first temperature range is reached the pipe is further heated to about 132° C., a temperature sufficient to cure the thermosetting resin and subequent to curing the pipe is allowed to cool down. Thus, the heating is effected not only subsequent to the wrapping but also in a plurality of stages from room temperature to the final temperature at which curing of the resin takes place. In the process, a resin-flowing temperature is first attained and then a resin-curing temperature is attained. Heating of the pipe is carried out with the aid of an induction device in which the pipe is passed through an induction coil which is fed by an alternating voltage of a frequency lying in the medium frequency range so as to effect the aforesaid uniform heating. Thus the whole pipe is progressively heated. When feeding by an alternating current frequency in the high frequency range as proposed in the prior art described only the outer zone of the pipe is heated due to skin effect. When heating in the medium frequency range as in this invention, the thermal capacity becomes higher.

BRIEF DESCRIPTION OF THE DRAWING

The FIGURE of the drawing is a perspective view of apparatus upon which the method of this invention is carried out.

DETAILED DESCRIPTION OF THE INVENTION

With reference to the drawing, an apparatus for practicing the method of this invention is illustrated therein. The pipe 1 to be coated is clamped in the rotatable jaw members J1 and J2 supported on the respective members 2 and 3, one of which members 2 is movable in a longitudinal direction toward and away from the other member 3 on guides 4 and 5. With the aid of the tackles 6 and 7, which are movable along an overhead rail 8, the pipe 1 can be suspended in or removed from the jaw members and suitable means such as the motor M is provided to rotate the pipe 1 about its longitudinal axis in a manner well known to those of ordinary skill in the art. A further overhead rail system 9 provides a mounting arrangement for a supporting and transporting mechanism 10 which is driven by an electric motor 11 for movement back and forth along the overhead rail system 9. The mechanism supports a winding mechanism referenced generally by the reference character W and, in axially offset relation thereto, the inductive heating coil 12. The winding mechanism includes the supply spool S for the wrapping tape and the bath B which contains a supply of the thermosetting resin. As illustrated, the tape is dispensed from the supply spool S into the bath of resin and onto the pipe 1 in a manner well known to those of ordinary skill in the art. During the wrapping step, the resin-impregnated tape is applied to the pipe 1 while it is being rotated about its longitudinal axis and while the transporting mechanism is being moved along the overhead rail system 9. During the wrapping step, the pipe is at room temperature and the resin does not readily flow so that, in consequence, desired sealing and insulation of the wrapped pipe is not attained. It is for this reason that the prior art has resorted to preheating the pipe to a temperature at which the resin will readily flow. An annular coil 12 is suspended to the supporting and transporting device. The coil 12 is fed from the alternating current generator 13. With the aid of the supporting and transporting mechanism 10 the coil is moved at the desired rate along the pipe 1, while the coil is fed by the desired current. During the transport the pipe is constantly rotated. After the pipe is wrapped around, it is heated in the manner described above up to about 90° C., a temperature increment being thus obtained at each passage of the pipe through the coil.

After some time the pipe 1 is further heated up to a curing temperature for the thermosetting resin of about 132° C. and subsequent to curing of the resin, the pipe 1 is allowed to cool down.

What is claimed is:

1. The method of covering metal objects such as pipes with a sealing and insulating layer which comprises the steps of:
    (a) providing the object at room temperature in supported relation about its longitudinal axis;
    (b) rotating the object while at room temperature about its longitudinal axis while wrapping a layer of resin-impregnated tape which does not readily flow at room temperature to the outer surface of the pipe, said resin comprising a synthetic thermosetting resin;
    (c) inductively heating the object substantially uniformly through its thickness beneath its wrapping a plurality of times progressively from one end to the other end thereof subsequent to the wrapping of step (b), while rotating the object about its axis, to elevate the temperature of the object in a plurality of stages from room temperature to a temperature below the curing temperature of the resin but which is sufficiently in excess of room temperature to allow the resin to flow on the outer surface of the object;
    (d) terminating the heating of step (c);
    (e) further inductively heating the object substantially uniformly throughout its thickness progressively from one end to the other end thereof to elevate the temperature of the object to a temperature at which the resin will cure;
    (f) allowing the resin to cure; and then
    (e) cooling the object to room temperature.

2. The method as defined in claim 1 wherein the temperature to which the object is uniformly heated in step (c) is about 90° C.

3. The method as defined in claim 2 wherein the temperature to which the object is heated in step (e) is about 132° C.

4. The method of covering elongate metal objects such as pipes with a sealing and insulating coating which comprises a tape winding impregnated with cured synthetic thermosetting resin which comprises the steps of:
    (a) supporting the elongate metal object for rotation about its longitudinal axis;
    (b) rotating the object about its longitudinal axis while the object is at an initial, room temperature;
    (c) passing the tape through a bath of the thermosetting resin which does not readily flow while at room temperature and, while the object is being rotated at room temperature as in step (b), wrapping the object from one end thereof to the other end thereof with the resin-impregnated tape which has been bathed in the thermosetting resin;
    (d) inductively heating the wrapped object beneath its wrapping in a plurality of stages subsequent to the wrapping of step (c) and while rotating the object about its axis until the temperature of the object beneath the wrapping has been elevated in a plurality of stages from room temperature to a temperature which is sufficiently in excess of room temperature to allow the resin readily to flow and spread, the inductive heating being effected by transporting an inductive coil surrounding the wrapped object a plurality of times progressively from one end to the other end of the wrapped object while energizing the coil to heat the metal object substantially uniformly in its thickness direction beneath its wrapping;
    (e) terminating the heating of step (d) while continuing the rotation of the object about its longitudinal axis for a time sufficient to allow the resin to flow and spread;
    (f) further inductively heating the wrapped object substantially uniformly in its thickness direction beneath its wrapping progressively from one end to the other end thereof to a temperature at which the thermosetting resin will cure, and allowing the resin to cure; and then
    (g) cooling the wrapped, sealed and insulated object to room temperature.

5. The method as defined in claim 4 wherein the temperature to which the object is heated in step (d) is about 90° C.

6. The method as defined in claim 5 wherein the temperature to which the object is heated in step (f) is about 132° C.

* * * * *